United States Patent
Takahara

(10) Patent No.: US 7,263,929 B2
(45) Date of Patent: Sep. 4, 2007

(54) INITIATOR

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 510 days.

(21) Appl. No.: 10/509,243

(22) PCT Filed: Mar. 17, 2003

(86) PCT No.: PCT/JP03/03149

§ 371 (c)(1),
(2), (4) Date: Dec. 3, 2004

(87) PCT Pub. No.: WO03/083405

PCT Pub. Date: Oct. 9, 2003

(65) Prior Publication Data

US 2006/0018077 A1    Jan. 26, 2006

(30) Foreign Application Priority Data

Mar. 29, 2002   (JP)  ............... 2002-095611

(51) Int. Cl.
     *F42B 3/10*     (2006.01)
(52) U.S. Cl. ............... 102/202.7; 102/202.14; 102/202.5; 280/737
(58) Field of Classification Search ............ 102/202.7, 102/202.14, 202.5, 202.12; 280/737
See application file for complete search history.

(56) References Cited

U.S. PATENT DOCUMENTS

| | | | |
|---|---|---|---|
| 3,567,245 A * | 3/1971 | Ekstrom | ............ 280/737 |
| 4,858,951 A | 8/1989 | Lenzen | |
| 5,257,819 A * | 11/1993 | Frantom et al. | ............ 280/737 |
| 5,821,446 A | 10/1998 | Chatley, Jr. | |
| 6,116,642 A * | 9/2000 | Shirk et al. | ............ 280/737 |
| 6,295,935 B1 | 10/2001 | Swann et al. | |
| 6,591,752 B2 * | 7/2003 | Blomquist | ............ 102/202.5 |
| 6,823,796 B1 * | 11/2004 | Amano | ............ 102/202.14 |
| 6,923,122 B2 * | 8/2005 | Hennings et al. | ............ 102/202.7 |
| 6,936,303 B1 * | 8/2005 | Katsuda et al. | ............ 427/117 |
| 2002/0069782 A1 | 6/2002 | Avetisian et al. | |

FOREIGN PATENT DOCUMENTS

| | | |
|---|---|---|
| DE | 101 25 354 A1 | 12/2002 |
| EP | 1 164 349 A1 | 12/2001 |
| EP | 1 225 415 A1 | 7/2002 |
| JP | A 2-63951 | 3/1990 |

(Continued)

*Primary Examiner*—Michelle Clement
(74) *Attorney, Agent, or Firm*—Oliff & Berridge, PLC

(57) ABSTRACT

An initiator includes a pair of electrode pins, a conductive header, an insulator, a bridge wire, an explosive, and capsules. A bottom wall of the inner capsule has a protrusion projecting from the bottom wall. The thickness of an end wall portion of the protrusion is determined in such a manner that the end wall portion is the thinnest among a plurality of wall portions of the inner capsule. The thicknesses of the wall portions are set so as to increase gradually from the end wall portion of the protrusion toward the side wall of the inner capsule. Therefore, when the explosive is ignited for detonation, breakage of the inner capsule occurs in the vicinity of the end wall portion of the protrusion, and flame propagation energy generated by detonation of the explosive propagates in an intended direction.

2 Claims, 5 Drawing Sheets

FOREIGN PATENT DOCUMENTS

| | | |
|---|---|---|
| JP | U 2 144857 | 12/1990 |
| JP | A 6-249594 | 9/1994 |
| JP | A 9-504599 | 5/1997 |
| JP | U 3055652 | 10/1998 |
| JP | A 11-301402 | 11/1999 |
| JP | A 2000-168487 | 6/2000 |
| JP | A 2000-292100 | 10/2000 |
| JP | A-2001-191891 | 7/2001 |
| JP | A 2001-512227 | 8/2001 |
| WO | WO95/11421 | 4/1995 |
| WO | WO 02/073117 A1 | 9/2002 |

\* cited by examiner

INITIATOR

TECHNICAL FIELD

The present invention relates to an initiator to be employed in, for example, an airbag apparatus or a seatbelt pre-tensioner, either of which is to be furnished in a vehicle.

BACKGROUND ART

One of various known types of initiators is constituted by a pair of electrodes joined together via an insulator; a bridge wire connected with these two electrodes and adapted to generate heat when energized; and a capsule accommodating the bridge wire and an explosive able to detonate in response to heat generation of the bridge wire. This type of initiator is disclosed in, for example, Japanese Patent Application Laid-Open (kokai) No. H11-301402.

In order to manufacture the above-described type of initiator compactly, the individual components of the initiator must be reduced in size, which results in a reduction in the usable amount of explosive (the amount of explosive that can be charged in the capsule). For this reason, conceivably, when the explosive is ignited for detonation in such a downsized conventional structure, there arises a fear that a desired level of flame propagation energy cannot be obtained in an intended direction.

DISCLOSURE OF THE INVENTION

To solve the above-mentioned problems, the present invention provides an initiator comprising a pair of electrodes integrated together via an insulator; a bridge wire connected between the pair of electrodes and adapted to generate heat when energized; and a bottomed tubular capsule accommodating the bridge wire and an explosive which detonates in response to heat generation of the bridge wire, wherein a recess is formed in a central portion of a bottom wall of the capsule, the recess inducing breakage when the explosive is ignited for detonation, and a plurality of concentric grooves are formed around the recess in such a manner that an inner groove has a width and a depth greater than those of an outer groove.

With this configuration, when the explosive is ignited for detonation, breakage of the capsule can be concentrated in the vicinity of the central portion of the bottom wall of the capsule, so that flame propagation energy (pressure or flamepower) generated by detonation of the explosive propagates in an intended direction through the broken portion. Therefore, even if the amount of the explosive charged in the capsule is small, an intended magnitude of flame propagation energy can be attained in an intended direction upon detonation of the explosive. Accordingly, it is possible to reduce the size of the initiator while maintaining the function of the initiator.

Moreover, a plurality of concentric grooves are formed on the bottom wall of the capsule around the recess formed in the central portion of the bottom wall, in such a manner that an inner groove has a width and, a depth greater than those of an outer groove. Therefore, the strength of the bottom wall of the capsule can be increased from the central portion of the bottom wall toward the sidewall of the capsule by means of the plurality of concentric grooves around the recess. As a result, propagation of breakage from the central portion of the bottom wall toward the sidewall of the capsule can be reliably suppressed. Further, the strength of the bottom wall of the capsule can be increased from the central portion toward the sidewall of the capsule by means of a simple configuration.

When the present invention is practiced, in place of the plurality of concentric grooves around the recess formed in the central portion of the bottom wall of the capsule, there can be employed a spiral grove formed in such a manner that the spiral groove starts from the recess provided in the central portion of the bottom wall of the capsule, and the spiral gradually decreases in width and depth toward an outer circumferential portion of the bottom wall. In this case as well, action and effects similar to those described above can be expected.

BEST MODE FOR CARRYING OUT THE INVENTION

Figure 1:
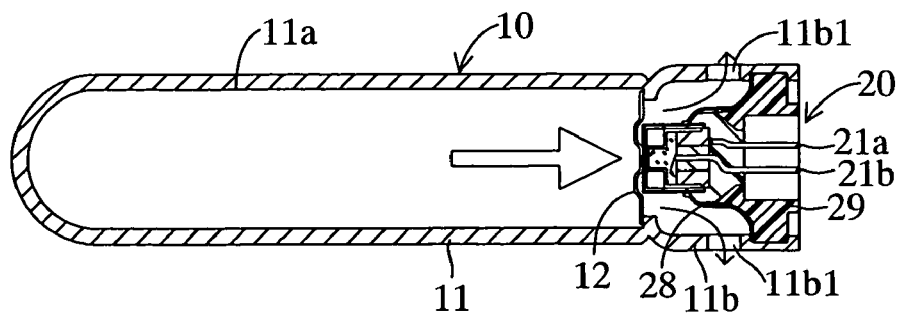
FIG. 1 is a cross-sectional view showing an inflator for an airbag apparatus to be mounted in a vehicle in which inflator an initiator according to an embodiment of the present invention is employed.

An embodiment of the present invention will now be described with the drawings. FIG. 1 shows an inflator 10 for an airbag apparatus to be mounted in a vehicle, the inflator 10 incorporating an initiator 20 according to the present invention. The inflator 10 of the present embodiment includes a casing 11 and a breakable gas sealing lid 12 mounted in an airtight manner in the casing 11. The casing 11 has a gas storage portion 11a, in which a high-pressure gas is enclosed, and an attachment portion 11b, to which the initiator 20 is attached.

While in an unbroken state, the gas sealing lid 12 serves to reserve a high-pressure gas in the storage portion 11a of the casing 11. Notably, when the gas sealing lid 12 is broken upon detonation of the initiator 20, the high-pressure gas spurts out of the gas storage portion 11a of the casing 11 toward an airbag (not shown) via an outflow opening 11b1 formed in the attachment portion 11b.

Figure 2:
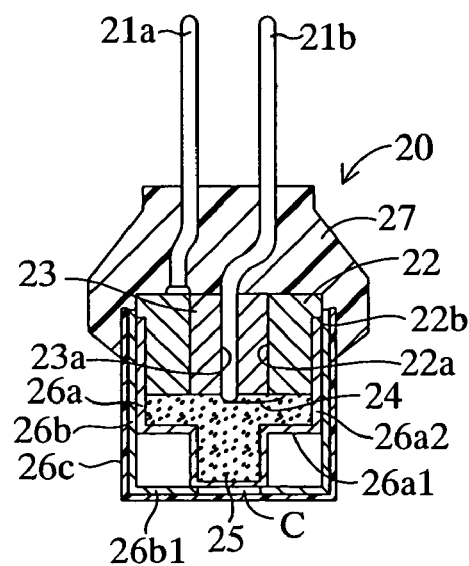
FIG. 2 is an enlarged cross-sectional view of a main portion of the initiator of FIG. 1.

Meanwhile, the initiator 20 includes a plurality of components shown, on an enlarged scale, in FIG. 2; e.g., a pair of electrode pins 21a and 21b, a conductive header 22, an insulator 23, a bridge wire 24, an explosive (gunpowder) 25, capsules 26a, 26b, and 26c, and a resin mold 27. Auxiliary components; e.g., a metallic holder 28 and a resin holder 29 are used to mount the initiator 20 in the inflator 10 as shown in FIG. 1.

One of the pair of electrode pins (hereinafter also called the first electrode pin) 21a is attached to the conductive header 22, and the other electrode pin (hereinafter also called the second electrode pin) 21b is attached to the conductive header 22 via the insulator 23. The conductive header 22 is formed of a conductive metal and has a cylindrical tube that has a hole 22a along its center axis, and an annular stepped portion 22b on its circumference.

The insulator 23 assumes the form of a cylindrical tube having an axial insertion hole 23a in which the second electrode pin 21b is tightly fitted, whereby the second electrode pin 21b is fixedly secured to the insulator 23 concentrically therewith. The insulator 23, which is made of heat- and pressure-resistant glass, is tightly fitted in the hole 22a of the conductive header 22 so as to be secured to the conductive header 22 concentrically therewith.

The bridge wire 24 is connected between the second electrode pin 21b and the conductive header 22; i.e., the bridge wire 24 is connected directly to the second electrode pin 21b, and indirectly to the first electrode pin 21a via the conductive header 22. When energized via the first and second electrode pins 21a and 21b, the bridge wire 24 generates heat to thereby cause the explosive 25 to detonate. The explosive 25, together with the bridge wire 24, is accommodated in a leak-proof state within the inner capsule 26a, and the explosive 25 comes in partial contact with the bridge wire 24.

The inner capsule 26a is formed of a thin metal sheet and has a bottomed tubular shape (a cup shape) whose bottom wall 26a1 is breakable upon detonation of the explosive 25. The open end of the inner capsule 26a is fitted to the circumference of the conductive header 22 and fixedly joined therewith in an airtight state by welding or other means. As shown on an enlarged scale in FIG. 3, the bottom wall 26a1 of the inner capsule 26a is formed so as to have a cylindrical protrusion which projects outward from the bottom wall 26a1 and which has a corner portion of substantially right angle.

Figure 3:
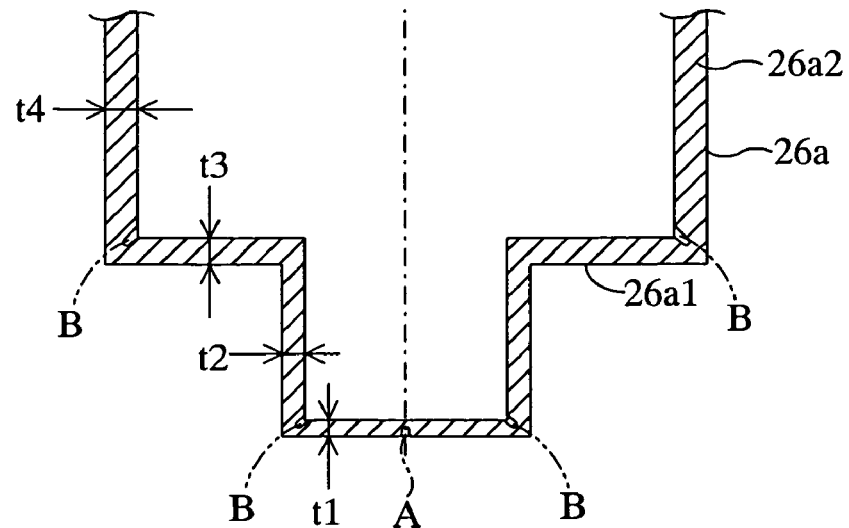
FIG. 3 is an enlarged cross-sectional view of a main portion of an inner capsule alone, which is shown FIGS. 1 and 2.

Further, as shown in FIG. 3, a sidewall (peripheral wall) 26a2 of the inner capsule 26a has a thickness t4; a first bottom portion of the bottom wall 26a1, which portion is continuous with the sidewall 26a2, has a thickness t3; a second bottom portion of the bottom wall 26a1, which portion extends (downward in FIG. 3) from the first bottom portion so as to form a peripheral wall portion of the protrusion, has a thickness t2; and a third wall portion of the bottom wall 26a1, which portion forms an end wall portion of the protrusion, has a thickness t1. These four thicknesses are determined so as to satisfy a relation t4>t3>t2>t1. By virtue of this geometry, when the explosive 25 is ignited for detonation, breakage of the inner capsule 26a instantaneously starts from the end wall portion of the protrusion of the bottom wall 26a1. In order that this breakage takes place reliably, a recess A (see an imaginary line in FIG. 3) which serves to induce breakage of the inner capsule 26a may be formed in a central portion of the end wall portion on an outer side thereof; and a notch (incision) B (see an imaginary line in FIG. 3) may be formed in each of the corners of the bottom wall 26a1 on an inner side thereof.

The intermediate capsule 26b is formed of a metal sheet thicker than the inner capsule 26a and has a bottomed tubular shape. A bottom wall 26b1 of the intermediate capsule 26b has an opening C facing the end wall portion of the protrusion of the inner capsule 26a. The open end of the intermediate capsule 26b is fitted to the circumference of the conductive header 22 and fixedly joined therewith by welding or other means. The outer capsule 26c is an insulator cap formed of a thin resin sheet and has a bottomed tubular shape. The outer capsule 26c is fixedly fitted to the circumference of the intermediate capsule 26b. The resin mold 27 is formed to integrally join the individual components; e.g., the first and second electrode pins 21a and 21b, the conductive header 22, the insulator 23, and the capsules 26a, 26b, and 26c.

The metallic holder 28 is formed of a metal sheet and, cooperates with the resin holder 29 to hold the initiator 20 of FIG. 2 in the manner shown in FIG. 1. The resin holder 29 is formed through molding in order to cover the initiator 20 assembled to the metallic holder 28. As shown in FIG. 1, the resin holder 29 is assembled to the casing 11 together with the metallic holder 28.

In the thus-constructed initiator 20 of the present embodiment, the bottom wall 26a1 of the inner capsule 26a is formed so as to have a protrusion projecting therefrom; the thickness of the end wall portion of the protrusion is determined such that the end wall portion is the thinnest among the wall portions of the inner capsule 26a; and the thicknesses of the wall portions are set so as to increase gradually from the end wall portion of the protrusion toward the side wall 26a2 of the inner capsule 26a. Therefore, when the explosive 25 is ignited for detonation, breakage of the inner capsule 26a can be concentrated in the vicinity of the end wall portion of the protrusion, and flame propagation energy (pressure or flamepower) generated by detonation of the explosive 25 propagates in an intended direction (leftward; i.e., toward the gas sealing lid 12 in FIG. 1).

Further, because the flame propagation energy generated by detonation of the explosive 25 can be guided to the end wall portion of the protrusion of the inner capsule 26a, the magnitude of the flame propagation energy in the above-described intended direction can be increased. Still further, the intermediate and outer capsules 26b and 26c are placed over the inner capsule 26a to constitute a capsule assembly having a layered structure such that an intended strength can be attained reliably at a bottom wall portion extending from a broken portion of the capsule assembly to the sidewall thereof. Therefore, progress of the breakage from the broken portion toward the sidewall of the capsule assembly can be restricted reliably.

Consequently, in the initiator 20 of the present embodiment, even if the amount of the explosive 25 charged in the inner capsule 26a is small, an intended magnitude of flame propagation energy can be attained in an intended direction upon detonation of the explosive 25. Accordingly, the initiator 20 can be assembled compactly while maintaining the proper function (i.e., the function of breaking the gas sealing lid 12 in the inflator 10) of the initiator 20.

Figure 4:
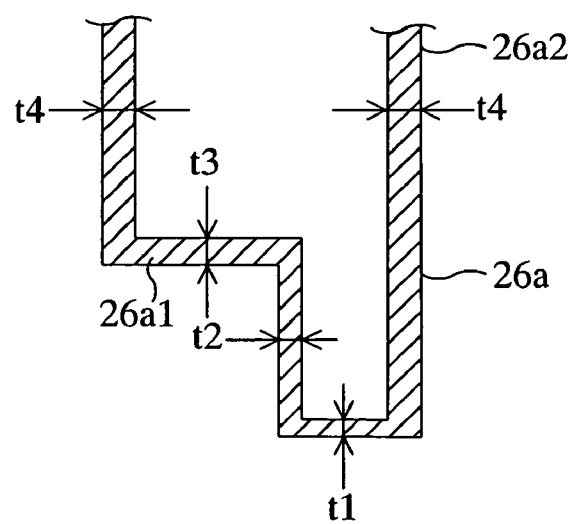
FIG. 4 is a schematic cross-sectional view of a first modification of the inner capsule of FIG. 3.

In the above-described embodiment, as shown in FIGS. 1 to 3, the bottom wall 26a1 of the inner capsule 26a of the initiator 20 has a protrusion projecting from the center of the bottom wall 26a1. However, as schematically shown in FIG. 4, the protrusion projecting from the bottom wall 26a1 of the inner capsule 26a may be offset a predetermined distance from the center of the bottom wall 26a1. In this first modification, the sidewall 26a2 of the inner capsule 26a has a thickness t4; a first wall portion of the bottom wall 26a1, which portion is continuous with the sidewall 26a2, has a thickness t3; a second wall portion of the bottom wall 26a1, which portion extends (downward in FIG. 4) from the bottom wall 26a1 so as to form a peripheral wall portion of the protrusion, has a thickness t2; and a third wall portion of the bottom wall 26a1, which portion forms an end wall portion of the protrusion, has a thickness t1. These four thicknesses are determined so as to satisfy a relation t4>t3≧t2>t1. Therefore, in the first modification, the same operation and results as in the above-described embodiment can be expected, and the direction (i.e., the intended direction) of propagation of the flame propagation energy can be adjusted by adjustably setting the above-described offset distance.

Further, in the above-described embodiment, as shown in FIGS. 1 to 3, the bottom wall 26a1 of the inner capsule 26a in the initiator 20 has a protrusion projecting from the center of the bottom wall 26a1 so that breakage of the inner capsule 26a is induced (i.e., initiated) at the central portion of the bottom wall 26a1 upon detonation of the explosive 25 and that progress of the breakage from the central portion toward the sidewall 26a2 is restricted. However, the initiator 20 may be constructed according to a second, a third, or a fourth modification as schematically shown in FIG. 5, FIGS. 6 to 8, or FIG. 9, respectively.

Figure 5:
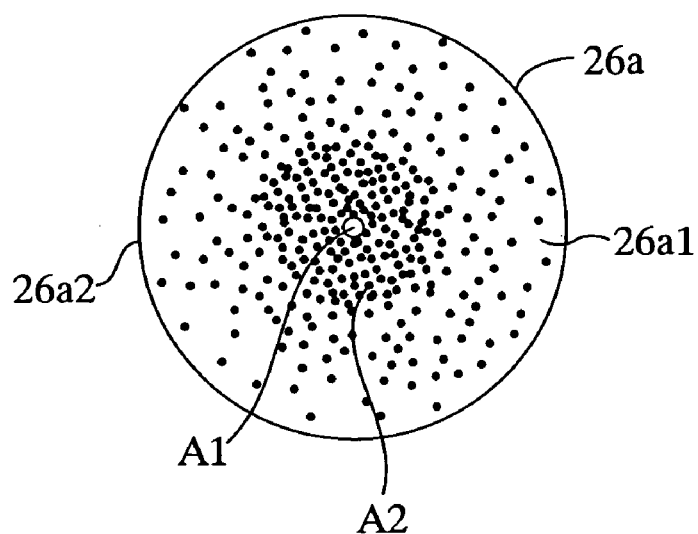
FIG. 5 is a schematic cross-sectional view of a second modification of the inner capsule of FIG. 3.

In the second modification of FIG. 5, a large-size recess A1 serving to induce breakage is formed in a central portion of the bottom wall 26a1 of the inner capsule 26a, and a plurality of small-size recesses A2 are formed in the bottom wall 26a1 in a varying density decreasing gradually from the central portion of the bottom wall 26a1 toward the peripheral portion thereof (i.e., the sidewall 26a2 of the inner capsule 26a). In the present modification, because the plurality of small-size recesses A2 are formed in the above-described distribution, the strength increases gradually from the central portion of the bottom wall 26a1 toward the peripheral portion thereof.

Figure 6:
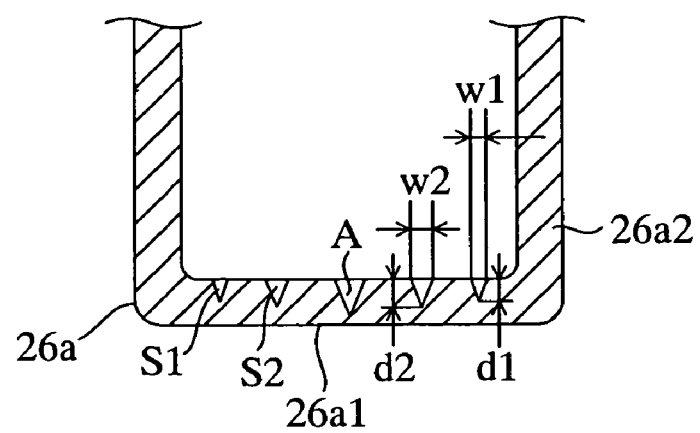
FIG. 6 is a schematic cross-sectional view of a third modification of the inner capsule of FIG. 3.
Figure 7:
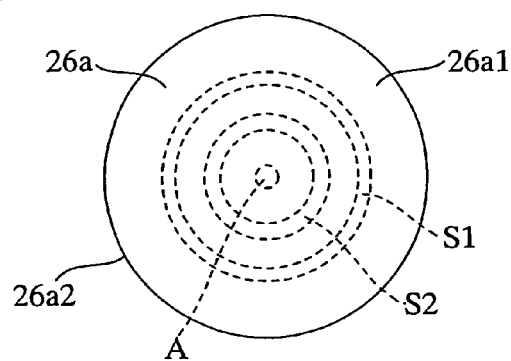
FIG. 7 is a bottom plan view of the inner capsule of FIG. 6.
Figure 8:
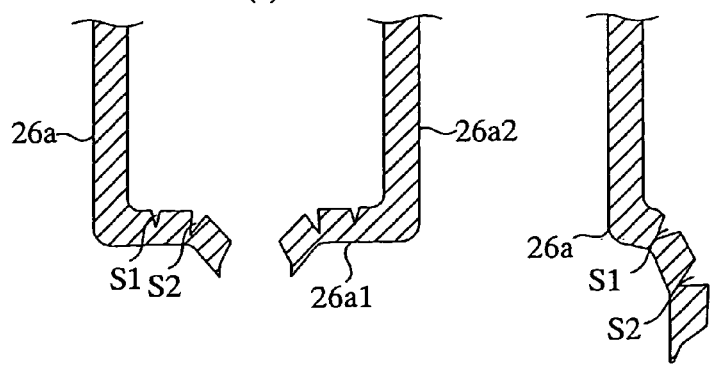
FIG. 8 is explanatory view illustrating transitional stages of breakage of the inner capsule of FIGS. 6 and 7.
Figure 8:
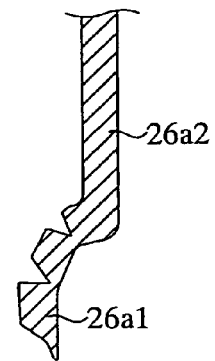

In the third modification shown in FIGS. 6 to 8, a recess A serving to induce breakage is formed in a central portion of the bottom wall 26a1 of the inner capsule 26a, and a plurality of concentric annular grooves (hereinafter also called outer and inner annular grooves) S1 and S2 are formed around the recess A. The outer annular groove S1 has a width w1 and a depth d1. Meanwhile, the inner annular groove S2 has a width w2 (w2>w1) and a depth d2 (d2>d1). By virtue of this geometry, in the present modification as well, the strength increases gradually from the central portion of the bottom wall 26a1 toward the peripheral portion thereof. Consequently, in the present modification, as shown in FIG. 8, the bottom wall 26a1 of the inner capsule 26a is broken gradually from the central portion of the bottom wall 26a1 toward the sidewall 26a2 of the inner capsule 26a in response to detonation of the explosive 25.

Figure 9:
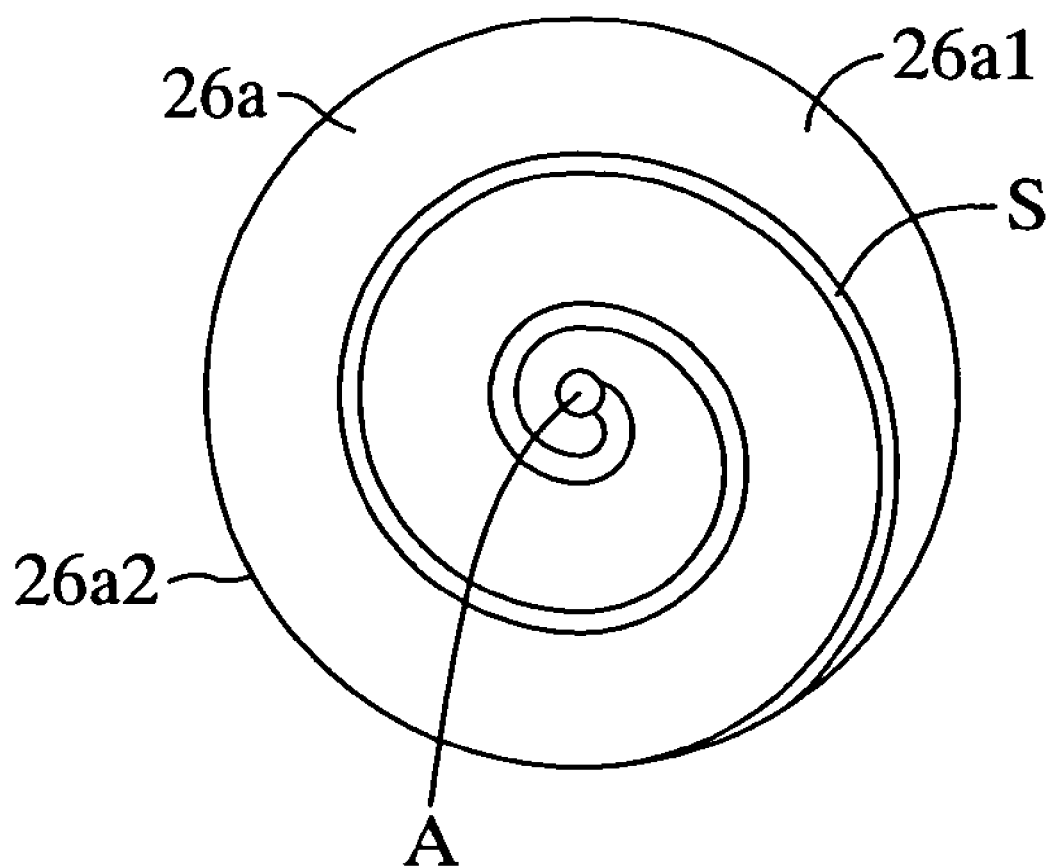
FIG. 9 is a schematic cross-sectional view of a fourth modification of the inner capsule of FIG. 3.

In the fourth modification of FIG. 9, a recess A serving to induce breakage is formed in a central portion of the bottom wall 26a1 of the inner capsule 26a, and a spiral groove S is formed in the bottom wall 26a1 around the recess A. In the present modification, the spiral groove S gradually decreases in both width and depth from the central portion of the bottom wall 26a1 toward the peripheral portion thereof and, therefore, the strength increases gradually from the central portion of the bottom wall 26a1 toward the peripheral portion thereof, as in the above-described embodiment and modifications.

In the above-described embodiment, the initiator 20 of the present invention is employed in the inflator 10 which is for use in an airbag apparatus to be mounted in a vehicle and is equipped with the casing 11 and the gas sealing lid 12. Alternatively, the initiator of the present invention may be employed in another type of inflator (e.g., an inflator equipped with a casing containing a gas generating agent which generates gas upon combustion) or another type of apparatus (e.g., a seatbelt pre-tensioner). In addition, in carrying out the present invention, two or more of the features of the above-described embodiment and modifications may be combined.

The invention claimed is:

1. An initiator comprising a pair of electrodes integrated together via an insulator; a bridge wire connected between the pair of electrodes and adapted to generate heat when energized; and a bottomed tubular capsule accommodating the bridge wire and an explosive which detonates in response to heat generation of the bridge wire, wherein a recess is formed in a central portion of a bottom wall of the capsule, the recess inducing breakage when the explosive is ignited for detonation, and a plurality of concentric grooves are formed around the recess in such a manner that an inner groove has a width and a depth greater than those of an outer groove.

2. An initiator comprising a pair of electrodes integrated together via an insulator; a bridge wire connected between the pair of electrodes and adapted to generate heat when energized; and a bottomed tubular capsule accommodating the bridge wire and an explosive which detonates in response to heat generation of the bridge wire, wherein a recess is formed in a central portion of a bottom wall of the capsule, the recess inducing breakage when the explosive is ignited for detonation, and a spiral grove is formed in such a manner that the spiral groove starts from the recess, and the spiral gradually decreases in width and depth toward an outer circumferential portion of the bottom wall.

* * * * *